(12) United States Patent
Walls-Bruck et al.

(10) Patent No.: US 8,607,561 B2
(45) Date of Patent: Dec. 17, 2013

(54) ACTUATING APPARATUS

(75) Inventors: Marcus Peter Johannes Walls-Bruck, Bristol (GB); Ian Paul Bond, Bradford-on-Avon (GB)

(73) Assignee: GE Aviation Systems Limited, Cheltenham Gloucestershire (GB)

( * ) Notice: Subject to any disclaimer, the term of this patent is extended or adjusted under 35 U.S.C. 154(b) by 447 days.

(21) Appl. No.: 12/951,114

(22) Filed: Nov. 22, 2010

(65) Prior Publication Data
US 2011/0131971 A1 Jun. 9, 2011

(30) Foreign Application Priority Data
Dec. 4, 2009 (GB) .................................. 0921269.7

(51) Int. Cl.
*F01B 29/10* (2006.01)
*F02G 1/04* (2006.01)

(52) U.S. Cl.
USPC ............................................. 60/527; 60/529

(58) Field of Classification Search
USPC ..................................................... 60/527–529
See application file for complete search history.

(56) References Cited

U.S. PATENT DOCUMENTS

| | | | | | |
|---|---|---|---|---|---|
| 3,663,839 | A | * | 5/1972 | Low et al. | 310/307 |
| 4,087,971 | A | * | 5/1978 | Hart | 60/527 |
| 4,700,541 | A | * | 10/1987 | Gabriel et al. | 60/528 |
| 4,751,821 | A | * | 6/1988 | Birchard | 60/698 |
| 4,761,955 | A | * | 8/1988 | Bloch | 60/528 |
| 5,556,370 | A | * | 9/1996 | Maynard | 600/151 |
| 5,594,330 | A | * | 1/1997 | Jacobsen | 324/106 |
| 5,626,312 | A | * | 5/1997 | Head | 244/99.8 |
| 5,744,947 | A | * | 4/1998 | Jacobsen et al. | 324/106 |
| 5,769,389 | A | * | 6/1998 | Jacobsen et al. | 251/129.06 |
| 5,933,002 | A | * | 8/1999 | Jacobsen et al. | 324/99 R |
| 5,996,346 | A | * | 12/1999 | Maynard | 60/527 |
| 6,992,474 | B2 | * | 1/2006 | Jacobsen | 324/106 |
| 7,451,595 | B2 | * | 11/2008 | Komori et al. | 60/527 |
| 2003/0053912 | A1 | | 3/2003 | Jacot et al. | |

FOREIGN PATENT DOCUMENTS

| | | |
|---|---|---|
| DE | 4113504 A1 | 11/1992 |
| JP | 2004278495 A1 | 10/2004 |
| RU | 2367573 C2 | 9/2009 |

OTHER PUBLICATIONS

International Search Report, Dated Apr. 20, 2010.

* cited by examiner

*Primary Examiner* — Kenneth Bomberg
*Assistant Examiner* — Christopher Jetton
(74) *Attorney, Agent, or Firm* — Global Patent Operation; Vivek P. Shankam

(57) ABSTRACT

An actuating apparatus which may be arranged to provide an actuating rotation or force on demand. The actuating apparatus comprises a resilient member having a plurality of co-acting elements such as a plurality of elongate rods and end-mounts arranged to move relative to each other. The resilient member is arrangeable in a first configuration and a second configuration such as a twisted configuration. An actuator which is preferably elongate is secured to the resilient member at least two points, preferably to each of the end mounts of the resilient member. The actuator is arranged to force the resilient member into one of or between the two configurations. The resilient member preferably includes a matrix which preferably surrounds at least a portion of the elongate rods.

9 Claims, 3 Drawing Sheets

ACTUATING APPARATUS

BACKGROUND OF THE INVENTION

1. Field of the Invention

The field of the invention relates to an actuating apparatus which can be arranged to provide an actuating rotation or force on demand.

2. Description of Related Art

Actuators are used in many technical fields, such as in the aerospace, energy, automotive and healthcare industries to provide an actuating force. For example, actuators are used for deployment of flight control surfaces on aircraft, the opening and closing of aerodynamic covers, hatches and doorways, control of the pitch of blades on wind turbines and tidal generators and actuators for supplying fluids etc. However, actuators typically comprise an assembly of discrete mechanical parts such as shafts, gearboxes, bearings, hinges, motors and locking mechanisms which are typically made from dense metallic components and so are heavy and require regular maintenance and inspection. Furthermore, such actuators require a drive to provide actuation such as a hydraulic actuator which typically requires complex arrangements of piping and as well as taking up often valuable space are often expensive and may suffer from problems such as leakage.

It would be desirable to provide an actuating apparatus which alleviates at least some of the problems of the prior art.

BRIEF SUMMARY OF THE INVENTION

According to embodiments of the present invention there is provided an actuating apparatus comprising a resilient member having a plurality of co-acting elements arranged to move relative to each other, the member being arrangeable in a first configuration and a second configuration and an actuator secured to the resilient member at at least two points, wherein the actuator is arranged to force the resilient member into one of or between the two configurations.

As the actuating apparatus includes a resilient member which is acted upon by the actuator, examples of the present invention provide a lightweight, compact and robust actuating apparatus.

The resilient member is preferably arranged to twist along its axial length when acted upon by the actuator. The resilient member preferably comprises a plurality of load bearing elongate rods secured at each end in a mount such that the end mounts are able to rotate relative to each other supported by flexing of the elongate rods. Such an arrangement substantially inhibits axial bending and buckling whilst allowing for large rotational deformations. The plurality of elongate elements may be embedded within a matrix, such as a polymer matrix or an elastomeric matrix to allow for large torsional rotations when in a first, relatively soft state and can maintain or "lock" the shape of the member when in a second relatively hard state, typically by being cooled or allowed to cool to a lower temperature.

The actuator may be wound around the resilient member to provide rotational actuation. The actuator may be elongate and the rotational actuation may be controlled by varying the length of the actuator. For example by contraction of the length of the elongate actuator, for example by the actuator being made from shape memory alloy which contracts during a phase transition, the resilient member may be twisted along its length. Alternatively, the actuator may be lengthened, for example by heating a wire or strip which may be metallic to allow release of a pre-twisted resilient member.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1:
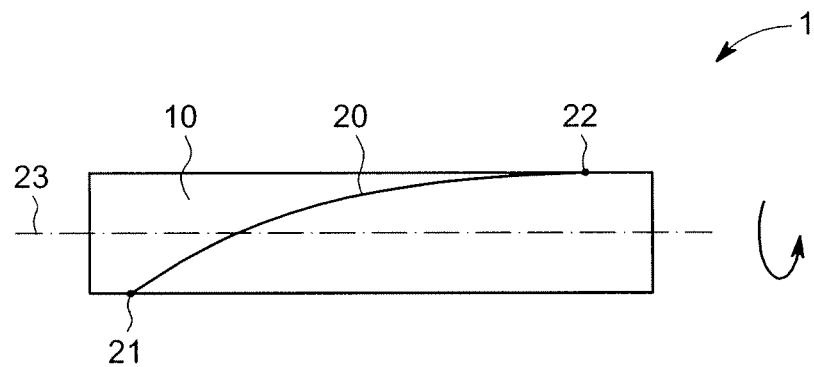
FIG. 1 shows a first example of the present invention.

As shown in FIG. 1 there is provided an actuating apparatus 1 comprising a resilient member 10 and an actuator 20 secured to the resilient member at two points 21, 22. The resilient member 10 is arrangeable in or between first and second configurations under control of the actuator 20.

In this example the actuator 20 is elongate and arranged to twist the resilient member 10 along its axis 23 by the actuator being arranged to be shortened or lengthened and wrapped around the resilient member 10 and secured at two distal points 21, 22. However, the resilient member could be arranged to undergo other types of distortion apart from twisting or rotation, such as contracting and stretching or bending about its axis for example.

In this example, the length of the actuator 20 is arranged to be variable to distort the resilient member 10 to a desired extent. The actuator 20 may comprise a length of shape memory alloy which undergoes axial contraction when actuated. Any suitable shape memory alloy may be used as is known in the art, such as for example nickel-titanium, copper-aluminium-nickel, copper-zinc-aluminium and iron-manganese-silicon alloys for example. The length of the actuator 20 may be arranged to contract upon actuation to cause the twisting of the flexible member. Alternatively, the actuator 20 may be arranged to lengthen upon actuation to allow a pre-twisted resilient member 10 to twist back to its original configuration upon actuation. The actuator 20 could be made from any suitable material. However, it has been found that shape memory alloys provide a practical change in length for a relatively small change in temperature which may be easily controlled, for example by passing an electric current therethrough. As well as the actuator 20 being a single elongate length or wire as shown in FIG. 1, it could also take the form of a plurality of elongate lengths or wires or a web of interconnected elongate lengths or wires which could have the same or different widths and lengths.

Figure 2:
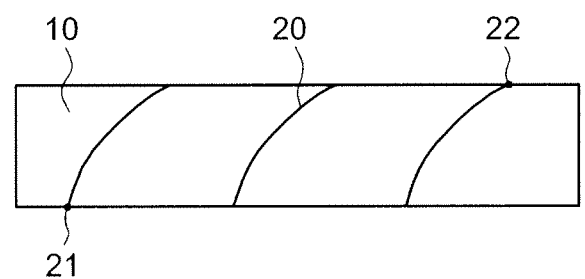
FIG. 2 shows a second example of the present invention.

FIG. 2 shows a further example of the present invention in which the actuator 20 has been wrapped around the flexible member 10 at a different winding angle to provide a desired, greater level of twisting within the flexible member 10 for a given change in length of the elongate actuator 20. Clearly, any desired winding angle may be used to provide a desired level of twisting of the elongate member 10 for any particular application. The appropriate winding configuration will depend upon the particular application and geometry of the flexible member. For example, a short member with a large diameter may only require a ¼ turn to achieve a suitable twist. However, the actuator may be wrapped once or several times around the resilient member 10.

Figure 3:
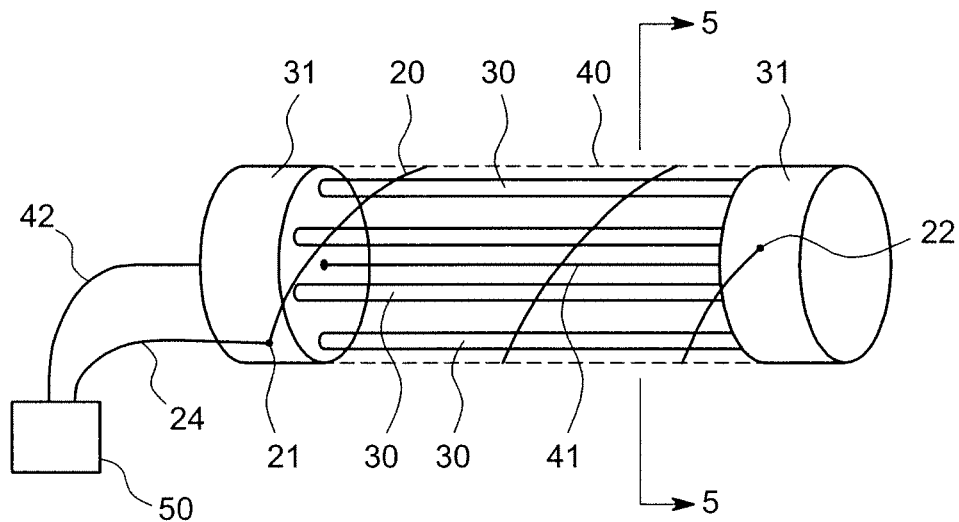
FIG. 3 is a perspective view of a more detailed example of the present invention.

FIG. 3 shows a perspective view of a more detailed example of the present invention. As can be seen, in this example the flexible member 10 is provided by a plurality of elongate elements or rods 30 which are secured at each end in mounts 31. The elongate rods 30 are preferably relatively stiff to provide a highly anisotropic flexible member 10 which has low torsional rigidity and is resistant to axial bending. The elongate rods may, for example, comprise pultruded fibre reinforced polymer composite rods which are resistant to axial bending due to their high flexural and compressive stiffness properties. One end of the actuator 21 is secured to one of the mounts 31 and the other end of the actuator 22 is secured to the other mount 31. Upon actuation of the actuator 20, the length of the actuator 20 contracts rotating one mount 31 relative to the other, twisting the flexible member 10. The axial stiffness of the beam produced by the elongate rods 30 enables rotation when actuated with little compressive strain making it very suitable for many applications, such as for a load bearing actuator.

In use, each mount 31 may be secured to a suitable structure to provide a desired effect, such as deployment of flight control surfaces on an aircraft, opening and closing of aerodynamic covers, hatches and doorways, control of the pitch of a blade on a wind turbine or actuation of a tap or valve for example.

The elongate rods 30 may be provided in a flexible matrix 40 provided between the mounts 31 and surrounding at least a portion of some of the elongate rods 30. The flexible matrix 40 is controlled to be in either relatively soft or hard forms, typically by heating or cooling above or below its specific temperature. When the resilient member 10 is being actuated, the matrix 40 is in its relatively low stiffness or soft form, typically by being heated, to allow distortion of the resilient member 10 and when the resilient member has been distorted to its desired extent the matrix 40 may be allowed to harden, for example by turning "off" the heat supplied to it so that the matrix hardens and "locks" the elongate rods 30 and the flexible member 10 in the desired actuated configuration. When it is desired to release the flexible member 10 back to its other configuration, the matrix 40 may be heated to soften it so that the resilience of the rods 30 in the mounts 31 returns the flexible member 10 back to its original non-twisted configuration. The matrix 40 may be heated and/or cooled by any suitable means. For example, heating may be provided by the actuator 20 to soften it during actuation or a separate heater 41 may be provided within the matrix to provide heating at appropriate times, typically upon actuation. In some applications the resilient member 10 may be provided in a fluid such as water and the fluid may be heated or cooled to soften or harden the matrix 40 appropriately. Deformed shapes can be maintained without constant actuation when the matrix 40 is cooled below its specific temperature to temporarily "lock" the resilient member 10 in the deformed state.

FIG. 3 also shows a controller 50, such as a microprocessor or computer for example. The controller 50 may provide a control signal or current 24 to the actuator 20 to control the variation in its length. The controller 50 may also provide a control signal or current 42 to the heater 41 to heat the matrix 40. The matrix material may be selected such that it will cool to its "locked" or relatively hard state when not being heated by heater 41.

Figure 4:
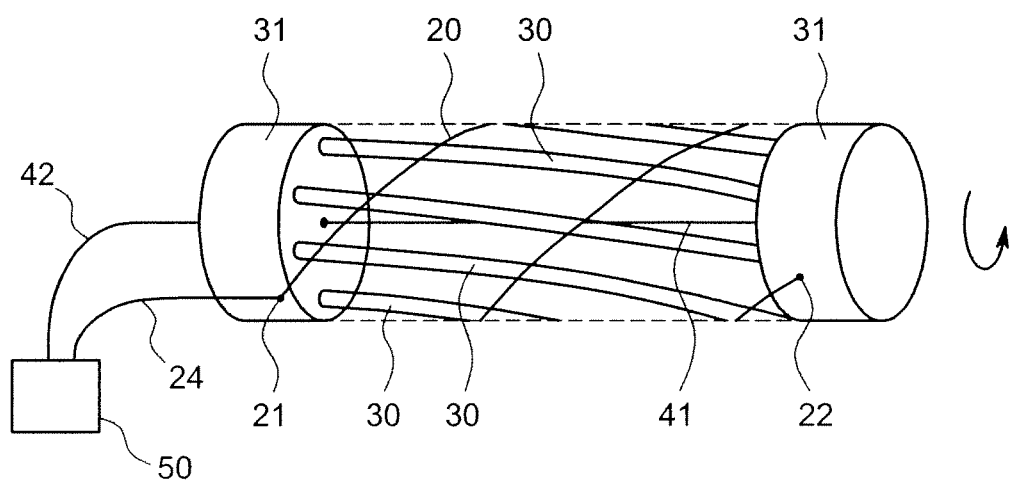
FIG. 4 shows the example of FIG. 3 with the resilient member in a twisted configuration.

FIG. 4 shows the resilient member 10 of FIG. 3 with the actuator 20 having twisted the resilient member 10. As can be seen, the elongate rods 30 have flexed to accommodate the relative rotation of the mounts 31 under the action of the actuator 20. In this example the actuator 20 has contracted to force the mounts 31 to rotate relative to each other. The matrix 40 will have been heated by the heater 41 to soften it before and/or during actuation and the resilient member 10 may be "locked" in the flexed configuration shown in FIG. 4 by allowing the matrix 40 to harden, typically by turning "off" the heater 41 and allowing the matrix 40 to cool. When "locked" by the matrix 40, power to the actuator 20 may be turned off saving energy. When it is desired to return to the configuration shown in FIG. 3, the matrix 40 may be softened, for example by heating, and the resilience of the elongate rods 30 will return the flexible member 10 to the configuration shown in FIG. 3.

The "locking" action of the matrix 40 and the flexibility of the elongate member 10 enables the actuator 20 to only have to be actuated once while the matrix 40 is soft to change from one configuration to another and then be locked in that second configuration by hardening of the matrix 40. To return to the other configuration, the matrix 40 is heated and the resilience of the elongate rods 30 returns the flexible member 10 to its previous configuration without having to use the actuator 20.

Figure 5:
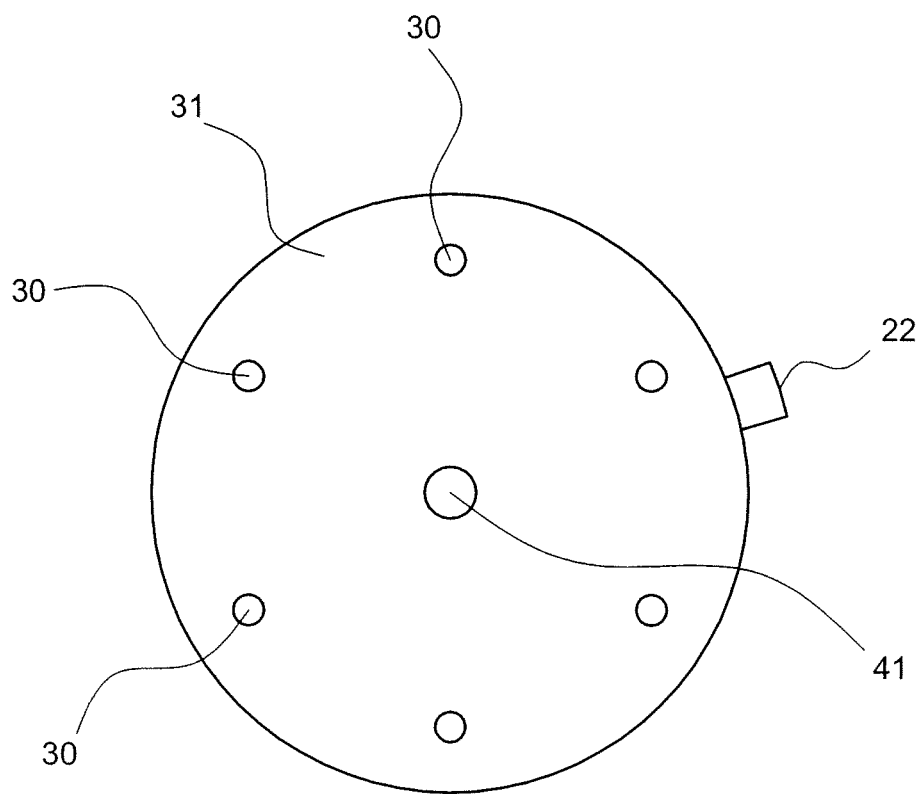
FIG. 5 is an end view of one of the mounts shown in FIGS. 3 and 4.

FIG. 5 is a cross-sectional view from lines 5-5 of FIG. 3 showing the inner side of the mount 31. In this example six substantially equiangularly spaced elongate rods 30 are shown. However, any number of one or more elongate rods 30 may be used in the flexible member 10. In this example a length of electrical heating wire 41 is shown passing through the axial centre of the mount 31 to heat the matrix 40 during twisting of the flexible member 10. The point 22 at which the elongate actuator 20 is secured to the mount 31 is also shown. The elongate actuator 20 may be secured to the mount 31 in any suitable way, such as by a screw, welding, gluing, crimping or attaching to a bracket provided on the mount 31.

An example of an actuating apparatus has been constructed comprising carbon fibre reinforced epoxy rods 30 of 1.7 mm diameter, embedded in silicone elastomer matrix 40 with the composite resilient beam 10 dimensions of 17.5 mm diameter and 110 mm length. Two prestrained (approximately 2%) 0.375 mm nickel-titanium SMA (shape memory alloy) wires were contained within silicone tubing to prevent damage to the matrix 40 when actuated and externally wound on to the composite beam 10. Various winding angles of about 25° to 50° to the axis were tested with 1, 1.5, 2 and 2.5 turns. Aluminium plate end tabs were bonded to slots on each end of the beam 10 and the SMA wires were attached with machine screws at one end and crimps at the other. The distance between the SMA wire mounting points was 150 mm.

A twist of above 25° was achieved at the equivalent of 90° per minute with no blocking load applied during initial trials and with no apparent beam deflection during rotation. Altering the number and winding angle of the actuator length 20 was found to alter the achievable torque and rotation which could be adapted to any suitable application.

Embodiments of the invention have been found to provide a lightweight, compact, and robust actuating apparatus as explained above. Many variations may be made to the example described above while still falling within the scope of the invention. For example any number of elongate actuators 20 may be used with any appropriate configuration or winding angle. Any suitable number of elongate rods 30 may be incorporated into the resilient member or rod 10 and any suitable materials may be used for the appropriate parts. The resilience of the member 10 may be provided by any suitable means such as by the flexibility of composite rods 30 and/or by the flexibility of the joint between the rods 30 and the mounts 31.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

The invention claimed is:

1. An actuating apparatus, comprising:
a polymer matrix having a plurality of load bearing rods secured by at each end in a mount such that the end mounts are able to rotate relative to each other supported by the flexing of the elongate rods, the matrix allows for torsional rotations when in a first, relatively soft state and is arranged to substantially maintain the shape of the member when in a second relatively hard state, and
an actuator secured to the polymer matrix at at least two points;
wherein the actuator is arranged to force the polymer matrix into one of or between a first configuration and a second configuration.

2. The actuating apparatus of claim 1, wherein the polymer matrix is arranged to twist along its axial length when acted upon by the actuator.

3. The actuating apparatus of claim 1, wherein the polymer matrix includes a heater to heat the polymer matrix above its specific temperature into its relatively soft state.

4. The actuating apparatus of claim 1, wherein the actuator is wound around the polymer matrix.

5. The actuating apparatus of claim 1, wherein the actuator is elongate and arranged to shorten its elongate length upon actuation.

6. The actuating apparatus of claim 5, wherein the elongate actuator is made from a shape memory material.

7. The actuating apparatus of claim 5, wherein the elongate actuator is arranged to lengthen upon actuation to allow release of the polymer matrix from a pre-stressed configuration.

8. The actuating apparatus of claim 1, wherein the actuator comprises a plurality of elongate lengths.

9. The actuating apparatus of claim 8, wherein the plurality of elongate lengths are interconnected providing a web-like actuator.

* * * * *